US010549358B2

(12) United States Patent
Ishi

(10) Patent No.: US 10,549,358 B2
(45) Date of Patent: Feb. 4, 2020

(54) INSERT, DRILL, AND METHOD OF MANUFACTURING MACHINED PRODUCT USING THE SAME

(71) Applicant: KYOCERA Corporation, Kyoto-shi, Kyoto (JP)

(72) Inventor: Hirohisa Ishi, Omihachiman (JP)

(73) Assignee: KYOCERA CORPORATION, Kyoto (JP)

( * ) Notice: Subject to any disclaimer, the term of this patent is extended or adjusted under 35 U.S.C. 154(b) by 78 days.

(21) Appl. No.: 15/553,758

(22) PCT Filed: Feb. 26, 2016

(86) PCT No.: PCT/JP2016/055844
§ 371 (c)(1),
(2) Date: Aug. 25, 2017

(87) PCT Pub. No.: WO2016/136949
PCT Pub. Date: Sep. 1, 2016

(65) Prior Publication Data
US 2018/0029141 A1    Feb. 1, 2018

(30) Foreign Application Priority Data

Feb. 26, 2015 (JP) .................................. 2015-036015

(51) Int. Cl.
*B23B 51/00* (2006.01)
*B23B 51/04* (2006.01)

(52) U.S. Cl.
CPC ............ *B23B 51/048* (2013.01); *B23B 51/04* (2013.01); *B23B 2200/202* (2013.01)

(58) Field of Classification Search
CPC ... B23B 27/16; B23B 27/164; B23B 27/1657; B23B 2200/0404; B23B 2200/0438;
(Continued)

(56) References Cited

U.S. PATENT DOCUMENTS 5,382,118 A * 1/1995 Satrap ..................... B23C 5/06
                                                                407/113
5,810,521 A * 9/1998 Pantzar ................. B23B 27/145
                                                                407/114

(Continued)

FOREIGN PATENT DOCUMENTS

EP    0587109 A1    3/1994
EP    2298477 A1    3/2011
(Continued)

OTHER PUBLICATIONS

International Search Report, PCT/JP2016/055844, dated Apr. 12, 2016, 2 pgs.

*Primary Examiner* — Nicole N Ramos
(74) *Attorney, Agent, or Firm* — Volpe and Koenig, P.C.

(57) ABSTRACT

An insert according to an embodiment includes an upper surface including a corner part, a lower surface, a side surface, and a cutting edge. The cutting edge includes a first cutting edge located at the corner part, a second cutting edge adjacent to the first cutting edge, a third cutting edge adjacent to the second cutting edge, and a fourth cutting edge adjacent to the third cutting edge. Each of the third cutting edge and the fourth cutting edge has a concave curvilinear shape extending downward in a side view. A radius of curvature of the fourth cutting edge is smaller than a radius of curvature of the third cutting edge.

15 Claims, 17 Drawing Sheets

(58) Field of Classification Search
CPC ...... B23B 2200/0447; B23B 2251/505; B23B 51/048; B23B 51/02; B23B 2200/0442; B23B 27/145; Y10T 408/905; Y10T 408/906; Y10T 408/9097; Y10T 408/909
See application file for complete search history.

(56) References Cited

U.S. PATENT DOCUMENTS

| | | | | |
|---|---|---|---|---|
| 5,951,214 | A * | 9/1999 | Rothballer | B23C 5/2213 |
| | | | | 407/113 |
| 8,915,681 | B2 * | 12/2014 | Ishi | B23C 5/06 |
| | | | | 409/132 |
| 2008/0075547 | A1 * | 3/2008 | Wolf | B23B 27/141 |
| | | | | 408/147 |
| 2009/0285646 | A1 * | 11/2009 | Oprasic | B23C 5/06 |
| | | | | 407/114 |
| 2010/0034602 | A1 * | 2/2010 | Sung | B23B 27/141 |
| | | | | 407/113 |
| 2010/0221076 | A1 * | 9/2010 | Takahashi | B23C 5/06 |
| | | | | 407/42 |
| 2010/0272526 | A1 * | 10/2010 | Dufour | B23B 27/141 |
| | | | | 407/114 |
| 2011/0044776 | A1 | 2/2011 | Ishi | |
| 2012/0063858 | A1 | 3/2012 | Onozawa et al. | |

FOREIGN PATENT DOCUMENTS

| | | |
|---|---|---|
| EP | 2436466 A1 | 4/2012 |
| JP | 61-214909 A | 9/1986 |
| WO | 2009/142323 A1 | 11/2009 |
| WO | 2010/137701 A1 | 12/2010 |

* cited by examiner

US 10,549,358 B2

INSERT, DRILL, AND METHOD OF MANUFACTURING MACHINED PRODUCT USING THE SAME

TECHNICAL FIELD

The present embodiment relates to an insert for use in a drilling process, a drill, and a method of manufacturing a machined product.

BACKGROUND ART

As an example of drills for use in the drilling process, an indexable insert drill described in PCT International Publication No. WO 2010-137701 (Patent Document 1) has been known. The drill described in Patent Document 1 is made up of a body part including a chip discharge flute, and an insert including a cutting edge for use in cutting, which is detachably attached to the body part. The drill described in Patent Document 1 includes two inserts of the insert including an inner peripheral cutting edge and the insert including an outer peripheral cutting edge. With the drill including the inner peripheral cutting edge and the outer peripheral cutting edge, cutting with the outer peripheral cutting edge has a relatively high cutting speed, and cutting with the inner peripheral cutting edge has a relatively low cutting speed.

SUMMARY

In an embodiment, an insert includes an upper surface, a lower surface, a side surface, and a cutting edge. The upper surface includes a corner part. The side surface is located between the upper surface and the lower surface. The cutting edge is located at least at a part of a region in which the upper surface and the side surface intersect each other. The cutting edge includes a first cutting edge located at the corner part, a second cutting edge adjacent to the first cutting edge, a third cutting edge adjacent to the second cutting edge, and a fourth cutting edge adjacent to the third cutting edge. Each of the third cutting edge and the fourth cutting edge has a concave curvilinear shape extending downward in a side view. A radius of curvature of the fourth cutting edge is smaller than a radius of curvature of the third cutting edge.

EMBODIMENTS

Figure 1:
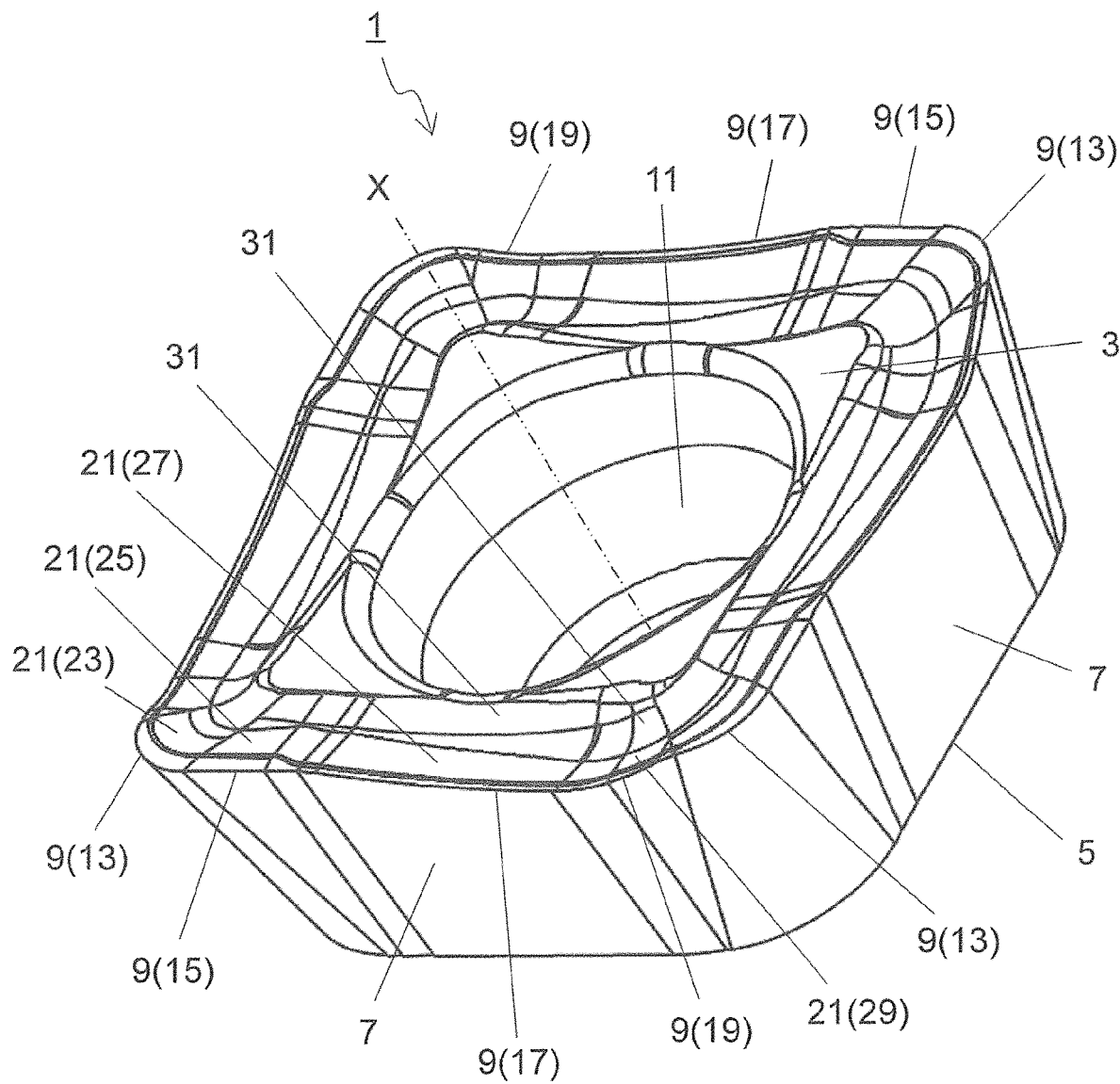
FIG. 1 is a perspective view that shows an insert according to an embodiment.

In a drill including an inner peripheral cutting edge (inner cutting edge) and an outer peripheral cutting edge (outer cutting edge), cutting with the outer peripheral cutting edge has a relative high cutting speed, and therefore a chip is apt to be divided. Cutting with the inner peripheral cutting edge has a relatively low cutting speed, and therefore a chip spirally extending long is apt to occur. A fine burr occurs at an outer peripheral-side edge in the spirally extend chip. This burr may cause damage to an inner peripheral surface of a drilled hole or the surface of the chip discharge flute.

An insert of an embodiment which is used for an indexable insert drill is described in detail below with reference to the drawings. For convenience of description, the drawings referred to in the following show, in simplified form, only major components necessary for describing the present embodiment. Therefore, the insert may include any optional component not shown in the drawings referred to in the present description. Sizes of the components in the drawings are not faithful to sizes of actual components and to size ratios of these individual components.

The insert 1 of the present embodiment is suitably used for the purpose of the inner cutting edge in the indexable insert drill. The insert 1 includes, for example, an upper surface 3, a lower surface 5, a side surface 7, a cutting edge 9, and a through hole 11 as shown in FIG. 1. For example, cemented carbide or cermet is usable as a material of the insert 1.

Examples of compositions of the cemented carbide include WC—Co, WC—TiC—Co, and WC—TiC—TaC—Co. Here, WC, TiC, and TaC are hard particles, and Co is a binding phase.

The cermet is a sintered composite material obtainable by compositing metal with a ceramic ingredient. Specific examples of the cermet include titanium compounds including such as titanium carbide (TiC) or titanium nitride (TiN) as a main ingredient.

A surface of the insert 1 may be coated with a coating film by using chemical vapor deposition (CVD) method or physical vapor deposition (PVD) method. As a composition of the coating film, there are, for example, titanium carbide (TiC), titanium nitride (TiN), titanium carbonitride (TiCN), and alumina ($Al_2O_3$).

Figure 2:
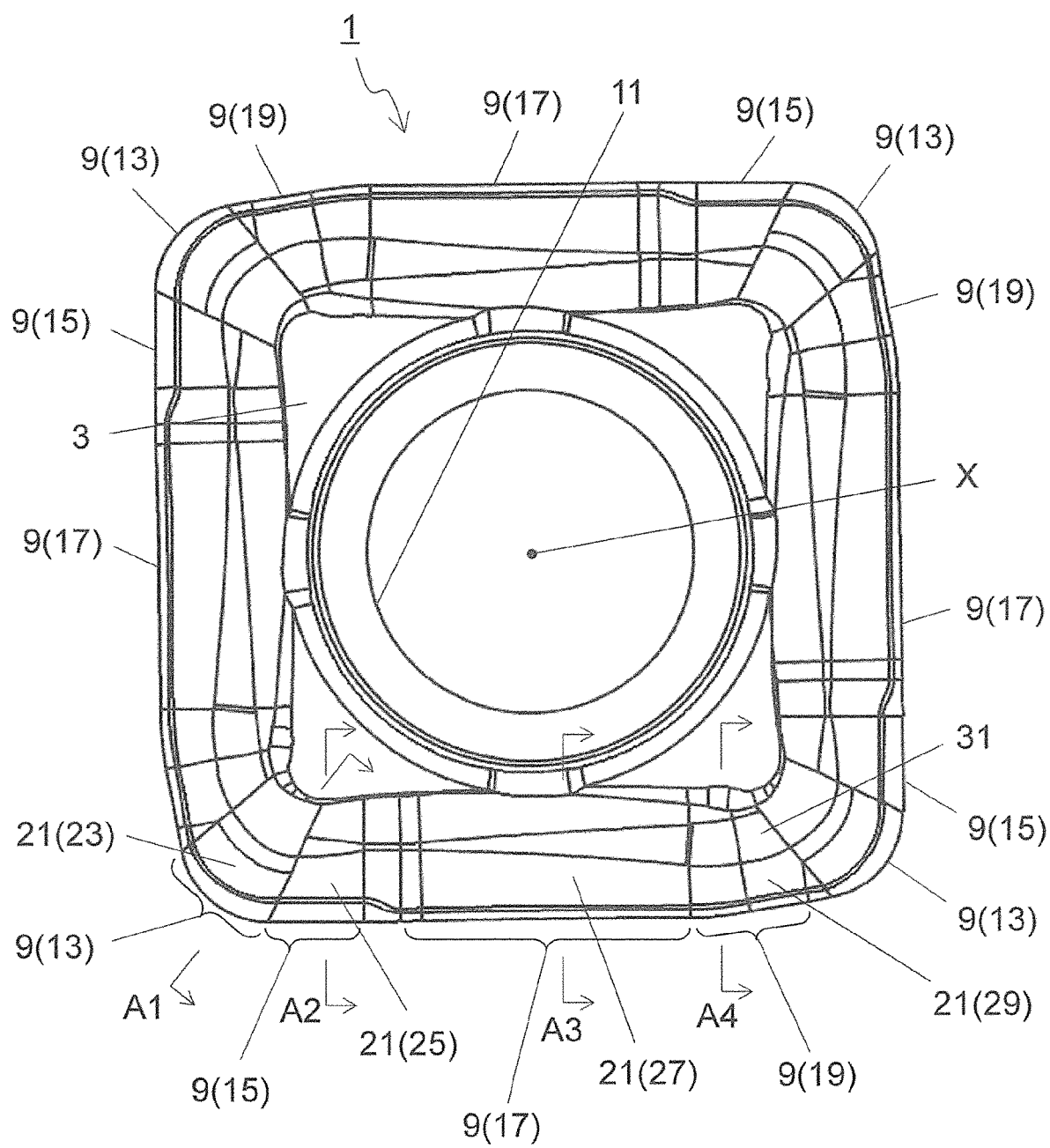
FIG. 2 is a top view of the insert shown in FIG. 1.

As shown in FIG. 2, the upper surface 3 has a polygonal shape including corner parts and side parts. The upper surface 3 in the present embodiment has an approximately quadrangular shape. Accordingly, the upper surface 3 includes four corner parts and four side parts. The four corner parts and the four side parts are so located as to have 90-degree rotational symmetry around a central axis X in a top view. The central axis X is set by an imaginary straight line passing through two points of the center of the upper surface 3 and the center of the lower surface 5.

Here, the polygonal shape does not mean a precise polygonal shape. For example, each of the four corner parts of the upper surface 3 in the present embodiment is not a precise corner, but has a rounded shape in a top view. The four side parts are not strictly limited to a straight line form, but may include any region having a curvilinear form.

Figure 3:
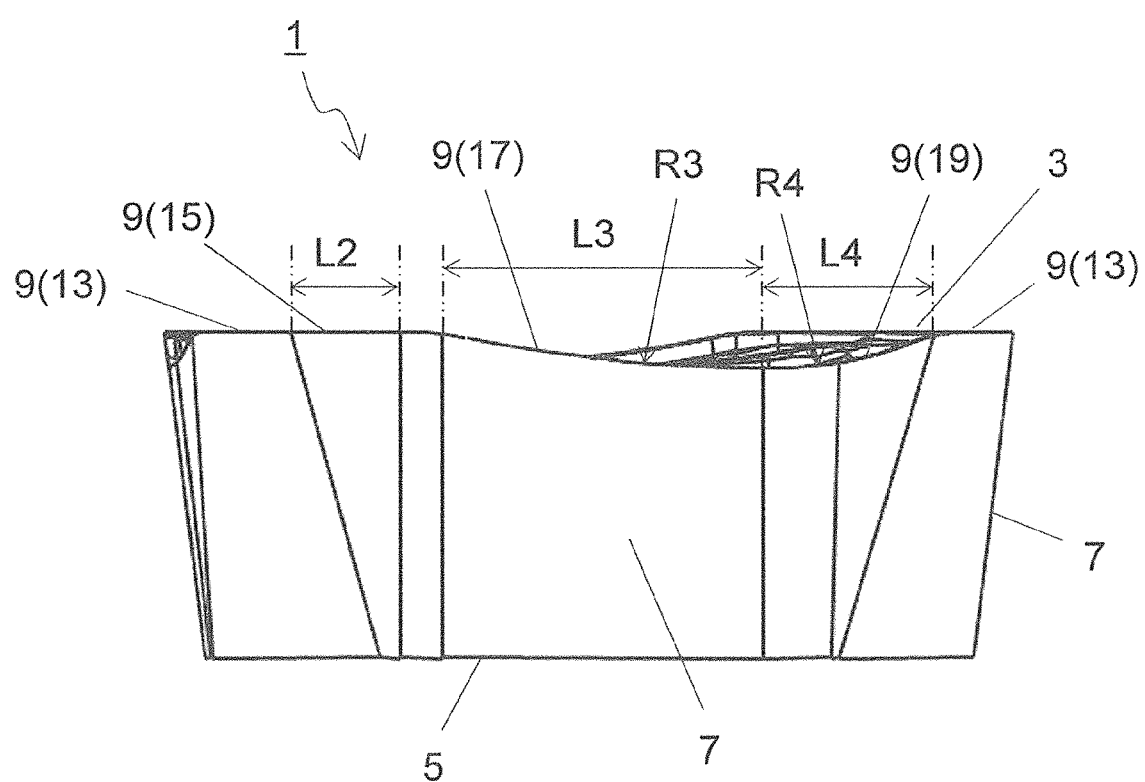
FIG. 3 is a side view of the insert shown in FIG. 1.

As shown in FIG. 3, the lower surface 5 is a surface located opposite to the upper surface 3, and serves as a seating surface onto a pocket when the insert 1 is attached to a holder. Similarly to the upper surface 3, the lower surface 5 in the present embodiment has a polygonal shape, which is slightly smaller than the upper surface 3. Therefore, an outer peripheral edge of the lower surface 5 is not visible due to the upper surface 3 in the top view shown in FIG. 2.

The shapes of the upper surface 3 and the lower surface 5 are not limited to the above embodiment. Although the upper surface 3 and the lower surface 5 have the approximately quadrangular shape in the insert 1 of the present embodiment, for example, the shapes of the upper surface 3 and the lower surface 5 in the top view may be a triangular shape, a pentagonal shape, a hexagonal shape, or an octagonal shape. Although the upper surface 3 in the present embodiment has an approximately square shape, the quadrangular shape is not limited to this shape, but may be a rhombus shape or rectangular shape.

As shown in FIG. 3, the side surface 7 is located between the upper surface 3 and the lower surface 5, and is connected to the upper surface 3 and the lower surface 5. When the lower surface 5 has the shape being slightly smaller than that of the upper surface 3 as described above, the side surface 7 has a trapezoidal shape in a side view. In other words, a longitudinal side of the side surface 7 in the side view as shown in FIG. 3 is inclined so as to approach the central axis X (not shown in FIG. 3) as going from the upper surface 3 toward the lower surface 5.

When the upper surface 3 in the insert 1 of the present embodiment is viewed from above, a maximum width thereof is 6-25 mm. A height from the lower surface 5 to the upper surface 3 is 1-10 mm. The height from the lower surface 5 to the upper surface 3 denotes a length in a direction parallel to the central axis X in between an upper end of the upper surface 3 and a lower end of the lower surface 5.

The configurations of the upper surface 3, the lower surface 5, and the side surface 7 are not limited to the above embodiment. For example, the lower surface 5 may have the same shape as the upper surface 3, and the outer periphery of the lower surface 5 may be overlapped with the outer periphery of the upper surface 3 in a planar perspective. In this case, the side surface 7 is disposed so as to be orthogonal to the upper surface 3 and the lower surface 5.

The insert 1 of the present embodiment includes a through hole 11 extending from the center of the upper surface 3 toward the center of the lower surface 5 as shown in FIG. 1. The through hole 11 is configured to receive a screw inserted when the insert 1 is screwed into the holder of the drill. The lower surface 5 in the present embodiment is a flat surface, and an extending direction, in other words, a penetrating direction of the through hole 11 is orthogonal to the lower surface 5.

The cutting edge 9 is located at least at a part of a region in which the upper surface 3 and the side surface 7 intersect each other. The cutting edge 9 is used for cutting a workpiece during a cutting process. As shown in FIGS. 1 and 2, the cutting edge 9 in the present embodiment includes a first cutting edge 13, a second cutting edge 15, a third cutting edge 17, and a fourth cutting edge 19. The first cutting edge 13 is located at the corner part of the upper surface 3. The second cutting edge 15, the third cutting edge 17, and the fourth cutting edge 19 are respectively located at the side part of the upper surface 3. That is, the second cutting edge 15, the third cutting edge 17, and the fourth cutting edge 19 are sequentially located on the side part of the upper surface 3 in a direction away from the first cutting edge 13.

The upper surface 3 in the present embodiment includes the four corner parts and the four side parts as described earlier. Therefore, when the first cutting edge 13, the second cutting edge 15, the third cutting edge 17, and the fourth cutting edge 19 constitute one set, the upper surface 3 has four sets. The following description focuses on one of these corner parts and a side part adjacent to this corner part.

The first cutting edge 13 is disposed at a position corresponding to the corner part of the upper surface 3. As described earlier, the corner part in the upper surface 3 has the rounded shape in the top view. Therefore, the first cutting edge 13 has a rounded shape in the top view. Specifically, the first cutting edge 13 has a circular arc shape protruding outward.

The second cutting edge 15 is adjacent to the first cutting edge 13. The second cutting edge 15 in FIG. 3 has a straight line form parallel to the lower surface 5. During the cutting process of the workpiece, the second cutting edge 15 is located closer to the center of the drill than the first cutting edge 13, and corresponds to a part configured to bite into the workpiece. When the second cutting edge 15 has the straight line form, it is ensured that the second cutting edge 15 more stably bites into the workpiece.

The third cutting edge 17 is adjacent to the second cutting edge 15. The fourth cutting edge 19 is adjacent to the third cutting edge 17. Here, the third cutting edge 17 need not necessarily be directly connected to the second cutting edge 15. Similarly, the fourth cutting edge 19 need not necessarily be directly connected to the third cutting edge 17. Each of the third cutting edge 17 and the fourth cutting edge 19 has a concave curvilinear shape that extends downward. Because the third cutting edge 17 and the fourth cutting edge 19 have the concave curvilinear shape, it is possible to curve chips generated by the third cutting edge 17 and the fourth cutting edge 19. This makes it easier for the chips to have a spiral shape, so that the chip behavior becomes stable.

In the insert 1 of the present embodiment, the third cutting edge 17 and the fourth cutting edge 19 do not have the same radius of curvature. Specifically, a radius of curvature R4 of the fourth cutting edge 19 is smaller than a radius of curvature R3 of the third cutting edge 17.

Figure 4A:
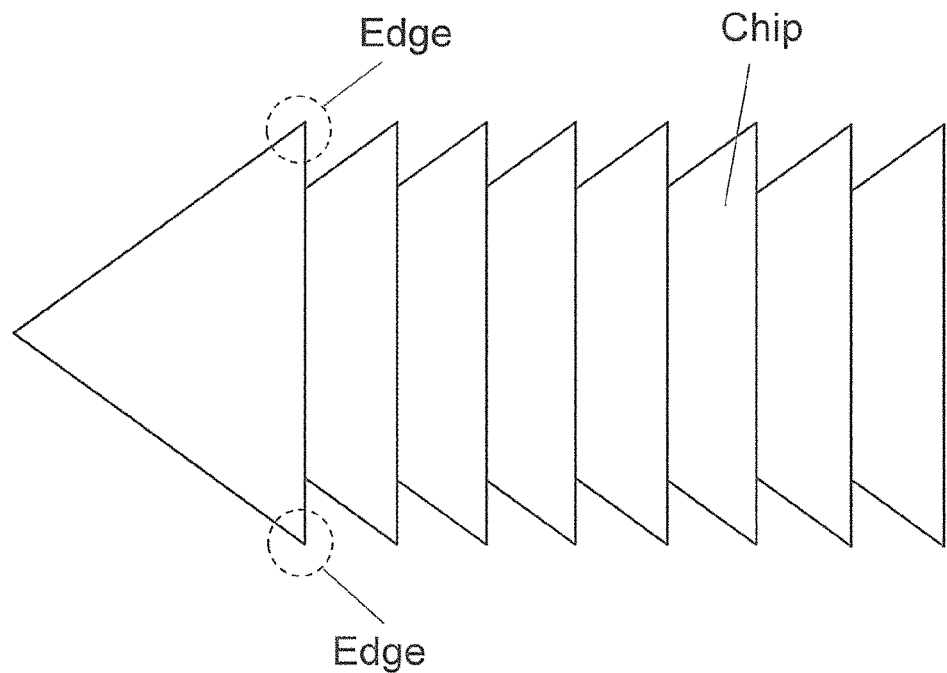
FIG. 4(a) is a schematic diagram of a chip in cases where a cutting process is carried out using a conventional insert.

The shape of chips generated when a workpiece is subjected to a cutting process using the insert 1 of the present embodiment is described below. Firstly, when the part corresponding to the fourth cutting edge 19 has a simple straight line form, an edge in the spiral-shaped chip is apt to protrude toward an outer periphery as shown in FIG. 4(a).

Figure 4B:
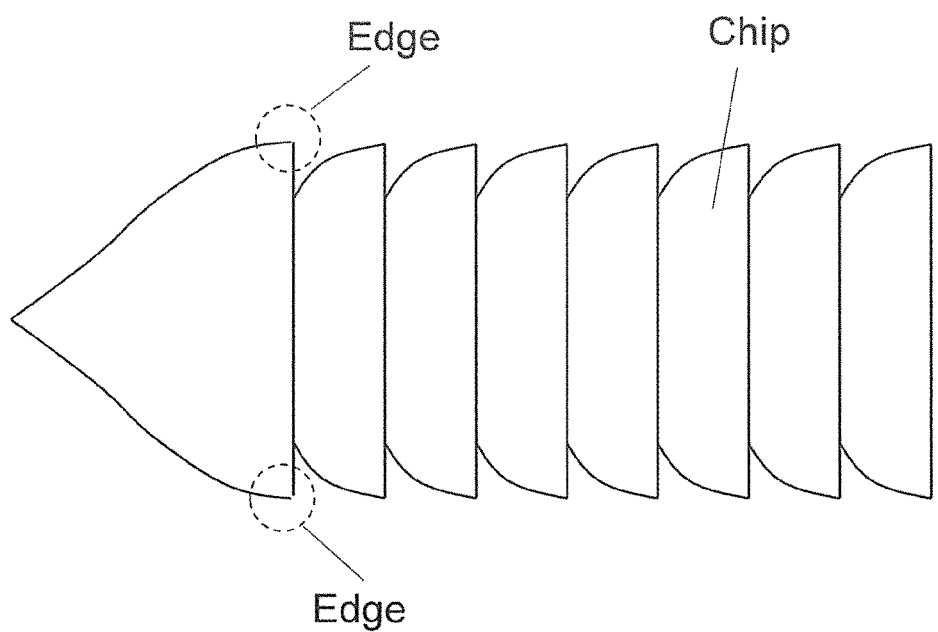
FIG. 4(b) is a schematic diagram of a chip in cases where the cutting process is carried out using the insert of the present embodiment.
Figure 5:
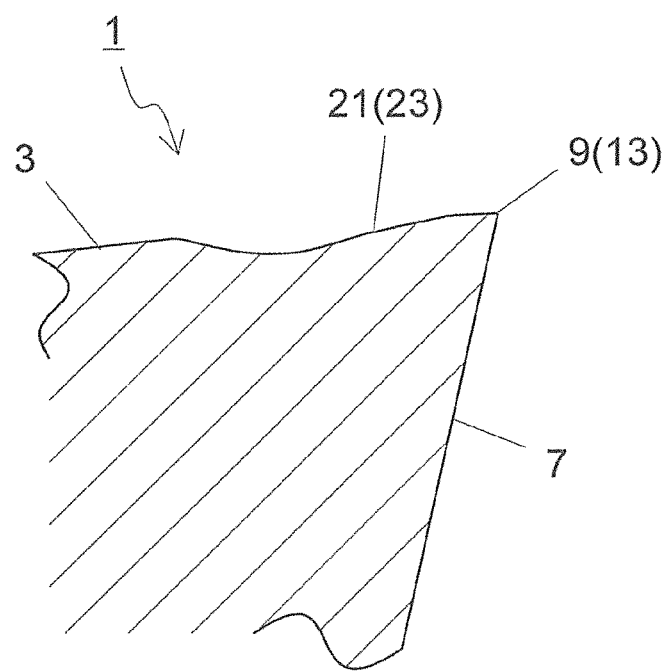
FIG. 5 is a sectional view taken at A1 of the insert shown in FIG. 2.

In contrast, because in the insert 1 of the present embodiment, the third cutting edge 17 and the fourth cutting edge 19 have the concave curvilinear shape, and the radius of curvature R4 of the fourth cutting edge 19 is smaller than the radius of curvature R3 of the third cutting edge 17, an edge in the spiral-shaped chip is less apt to protrude toward the outer periphery as shown in FIG. 4(b). Consequently, the edge in the chip is less apt to come into contact with the inner peripheral surface of the drilled hole and the surface of the chip discharge flute of the holder, and hence damage to these surfaces is less likely occurred.

The third cutting edge 17 in the present embodiment is inclined so as to extend downward as going farther from the second cutting edge 15 as shown in FIG. 3. The fourth cutting edge 19 in the present embodiment is inclined so as to extend upward as going farther from the third cutting edge 17. Therefore, a boundary between the third cutting edge 17 and the fourth cutting edge 19 is located at a lower end of the cutting edge 9. This makes it possible to cause the fourth cutting edge 19 to generate a stable outer peripheral-side edge in the spiral-shaped chip.

When a cutting edge part connecting the third cutting edge 17 and the fourth cutting edge 19 is located therebetween, the lower end of the cutting edge 9 is located at the cutting edge part, thereby making it possible to cause the fourth cutting edge 19 to generate the stable outer peripheral-side edge in the spiral-shaped chip.

When a curvature of the third cutting edge 17 and a curvature of the fourth cutting edge 19 are not constant, it is necessary to compare a minimum value of the radius of curvature in the third cutting edge 17 that inclines downward as going farther from the straight line-formed second cutting edge 15, and a minimum value of the radius of curvature in the fourth cutting edge 19 that inclines upward as going farther from the third cutting edge 17.

In the insert 1 of the present embodiment, a length L3 of the third cutting edge 17 is larger than a length L4 of the fourth cutting edge 19 in a side view. When the third cutting edge 17 and the fourth cutting edge 19 have the above configuration, chips are less likely to be curled excessively.

In the embodiment shown in FIG. 3, because the third cutting edge 17 is located at a center of the side part, and the length L3 of the third cutting edge 17 is larger than the length L4 of the fourth cutting edge 19, the lower end of the cutting edge 9 is located more away from the corner part at which the first cutting edge 13 is located, relative to the center of the side part. In other words, the lower end of the cutting edge 9 is deviated to the right relative to the center of the side part as shown in FIG. 3.

Also in the embodiment shown in FIG. 3, the length L3 of the third cutting edge 17 is larger than the length L2 of the second cutting edge 15 in a side view. When the length of the third cutting edge 17 having the concave curvilinear shape is relatively larger than that of the second cutting edge 15, it becomes easy to curve the chips. This makes it easier to bring the chips into a stable spiral shape, so that the chip behavior becomes more stable.

Although the cutting edge 9 in the present embodiment includes the first cutting edge 13, the second cutting edge 15, the third cutting edge 17, and the fourth cutting edge 19 as described above, the cutting edge 9 is not limited to one which is made up of only these parts. Specifically, a connection part (not shown) may be disposed between these cutting edge parts which smoothly connects them to each other. For example, the second cutting edge 15 having the straight line form and the third cutting edge 17 having the concave curvilinear shape may have therebetween a cutting edge part having a convex curvilinear shape which smoothly connects these cutting edges 15 and 17.

A region in which the upper surface 3 and the side surface 7 intersect each other and the cutting edge 9 is formed may be subjected to a so-called honing process. When subjected to the honing process, the region in which the upper surface 3 and the side surface 7 intersect each other is no longer a line form obtainable by the intersection of these two surfaces. Strength of the cutting edge 9 is improvable by applying the honing process.

As shown in FIGS. 1 and 2, the upper surface 3 in the present embodiment includes an inclined surface 21 that inclines downward as going farther from the cutting edge 9. In the present embodiment, the inclined surface 21 has such a role that is just like scooping up the chips generated at the cutting edge 9, namely, functions as a so-called rake surface. For a smooth flow of the chips, the inclined surface 21 is inclined downward as going farther from the cutting edge 9. In other words, the inclined surface 21 in the insert 1 of the present embodiment is inclined so as to come closer the lower surface 5 as coming closer to the through hole 11.

The inclined surface 21 in the present embodiment includes a first inclined surface 23, a second inclined surface 25, a third inclined surface 27, and a fourth inclined surface 29. The first inclined surface 23 is a region of the inclined surface 21 which is located along the first cutting edge 13. The second inclined surface 25 is a region of the inclined surface 21 which is located along the second cutting edge 15. The third inclined surface 27 is a region of the inclined surface 21 which is located along the third cutting edge 17. The fourth inclined surface 29 is a region of the inclined surface 21 which is located along the fourth cutting edge 19.

Figure 6:
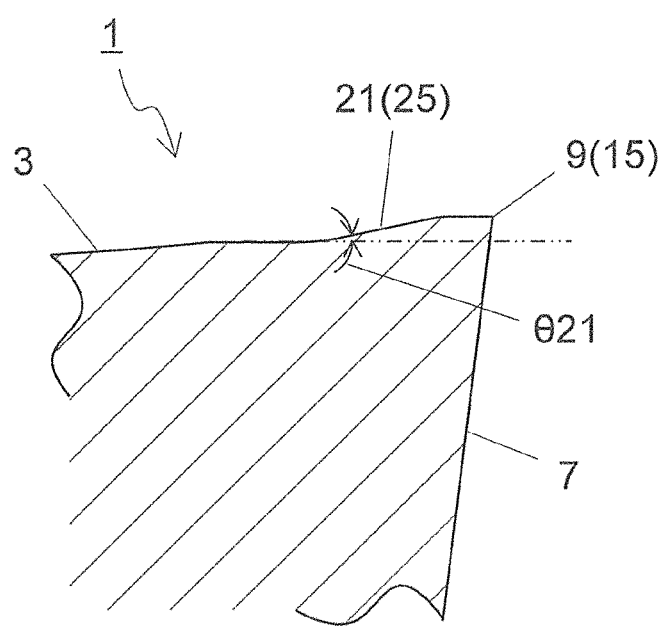
FIG. 6 is a sectional view taken at A2 of the insert shown in FIG. 2.
Figure 7:
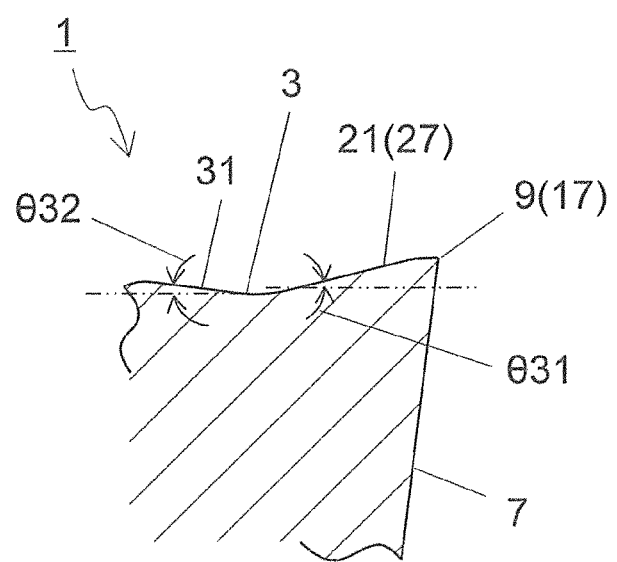
FIG. 7 is a sectional view taken at A3 of the insert shown in FIG. 2.
Figure 8:
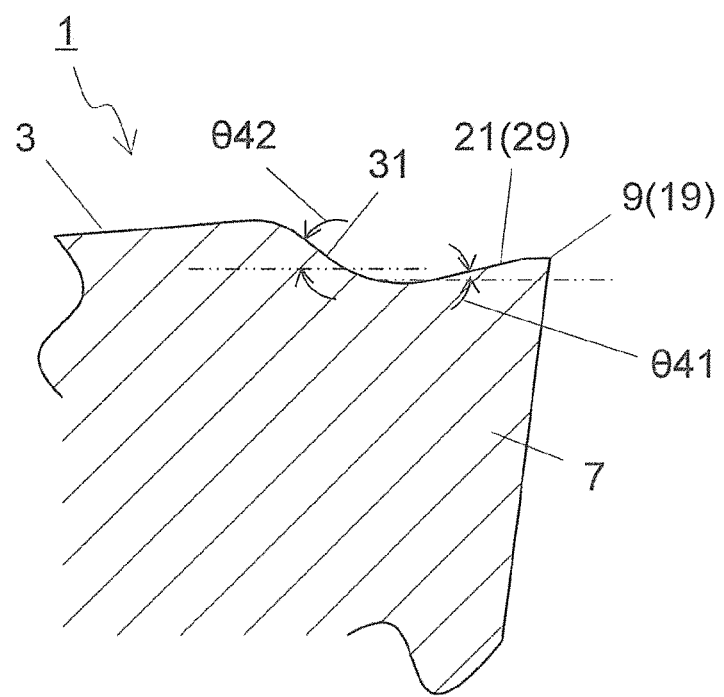
FIG. 8 is a sectional view taken at A4 of the insert shown in FIG. 2.

When each of an inclination angle $\theta 31$ of the third inclined surface 27 shown in FIG. 7, and an inclination angle $\theta 41$ of the fourth inclined surface 29 shown in FIG. 8 is larger than an inclination angle $\theta 21$ of the second inclined surface 25 shown in FIG. 6, it is possible to reduce load exerted on the second cutting edge 15 that bites into the workpiece. Moreover, because the inclination angle $\theta 21$ of the second inclined surface 25 located along the second cutting edge 15 is relatively small, the strength of the second cutting edge 15 is enhanced, thus leading to enhanced durability of the insert 1.

Additionally, the upper surface 3 in the present embodiment further includes, besides the inclined surface 21, an ascending surface 31 located further inside the upper surface 3 than the inclined surface 21. The ascending surface 31 has a role in curling chips passing through the inclined surface 21 and bringing the chips into the spiral shape. Therefore, the ascending surface 31 is located more inward than the inclined surface 21 and inclined upward as going farther from the inclined surface 21.

As shown in FIG. 2, the ascending surface 31 in the present embodiment is not located inside the entirety of the inclined surface 21, but is located only inside a region extending from the third inclined surface 27 to the fourth inclined surface 29. The ascending surface 31 is inclined upward as going farther from the third inclined surface 27 and the fourth inclined surface 29.

When the ascending surface 31 is located in the above region, the chips can be curled stably while reducing chip clogging that can occur in the second cutting edge 15.

As shown in FIGS. 7 and 8, when an inclination angle $\theta 42$ at a region of the ascending surface 31 which is located inside the fourth cutting edge 19 is larger than an inclination angle $\theta 32$ at a region of the ascending surface 31 which is located inside the third cutting edge 17, it is possible to stably bring the chips into the spiral shape. When the ascending surface 31 is so configured, it becomes easy to curve the chips generated at the fourth cutting edge 19 toward the center of the spiral-shaped chips. Consequently, the edge on the outer peripheral side of the chip is much less apt to come into contact with the inner peripheral surface of the drilled hole and the surface of the chip discharge flute of the holder.

Moreover, in order to more stably bring the chips into the spiral shape with the ascending surface 31, a height of an upper end of a region of the ascending surface 31 which is located inside the fourth cutting edge 19 is preferably located at a position higher than the fourth cutting edge 19.

<Drill>

A drill 101 of an embodiment is described below with reference to the drawings.

Figure 9:
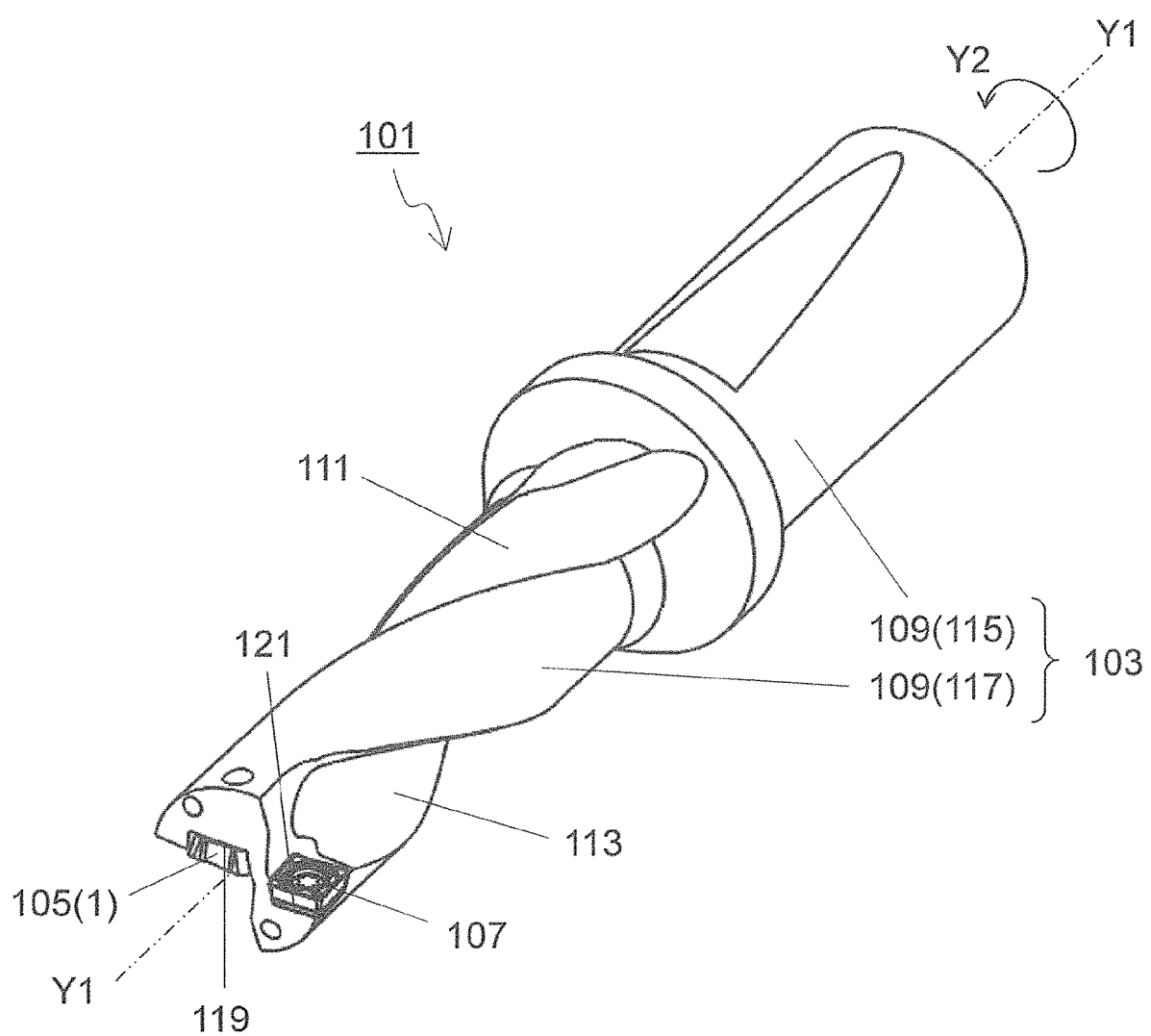
FIG. 9 is a perspective view that shows a drill according to an embodiment.

As shown in FIG. 9, the drill 101 of the present embodiment includes a holder 103, an insert 105 for an inner cutting edge, and an insert 107 for an outer cutting edge. An embodiment using the insert 1 of the present embodiment as the insert 105 for the inner cutting edge is described below.

The holder 103 includes a body part 109, a first chip discharge flute 111 (hereinafter also referred to simply as "a first flute 111"), and a second chip discharge flute 113 (hereinafter also referred to simply as "a second flute 113"). The body part 109 has a bar shape being rotatable around a rotation axis Y1. The body part 109 rotates around the rotation axis Y1 during a cutting process.

Although not particularly being illustrated, a rotary locus of the cutting edge 9 in the insert 105 for the inner cutting edge and a rotary locus of the cutting edge in the insert 107 for the outer cutting edge are partially overlapped with each other in a front end view, and are overlapped with the entirety of the body part 109. A drilling process is carried out by the cutting edges of the insert 105 for the inner cutting edge and the insert 107 for the outer cutting edge which are formed as described above.

The body part 109 in the present embodiment includes a holding section 115 which is held by, for example, a rotating spindle of a machine tool (not shown), and is called "shank", and a cutting section 117 which is located closer to a front end side than the holding section 115 and is called "body." The holding section 115 is a section to be designed according to the shape of the spindle and the like in the machine tool. The cutting section 117 is a section in which the inserts 105 and 107 are attached to a front end of the cutting section 117. The cutting section 117 plays a major role in the cutting process of a workpiece. Arrow Y2 indicates a rotation direction of the body part 109.

Figure 10:
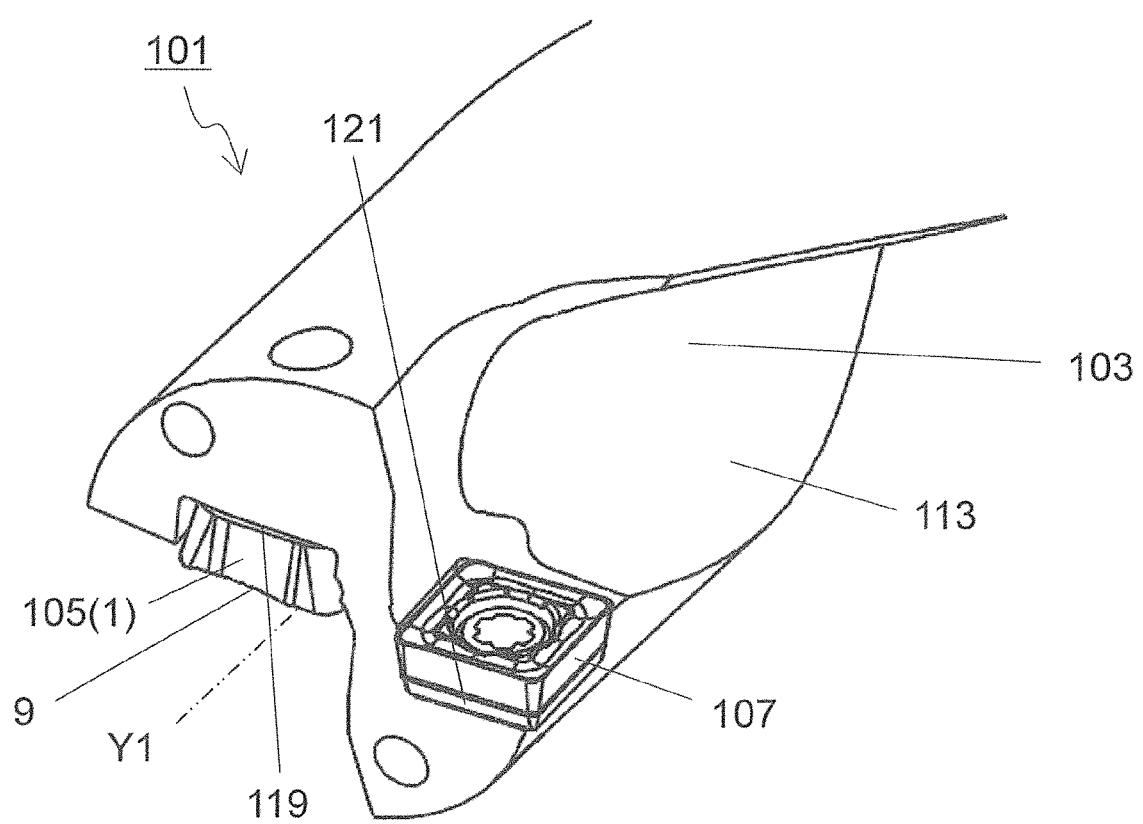
FIG. 10 an enlarged view of a front end part of the drill shown in FIG. 9.
Figure 11:
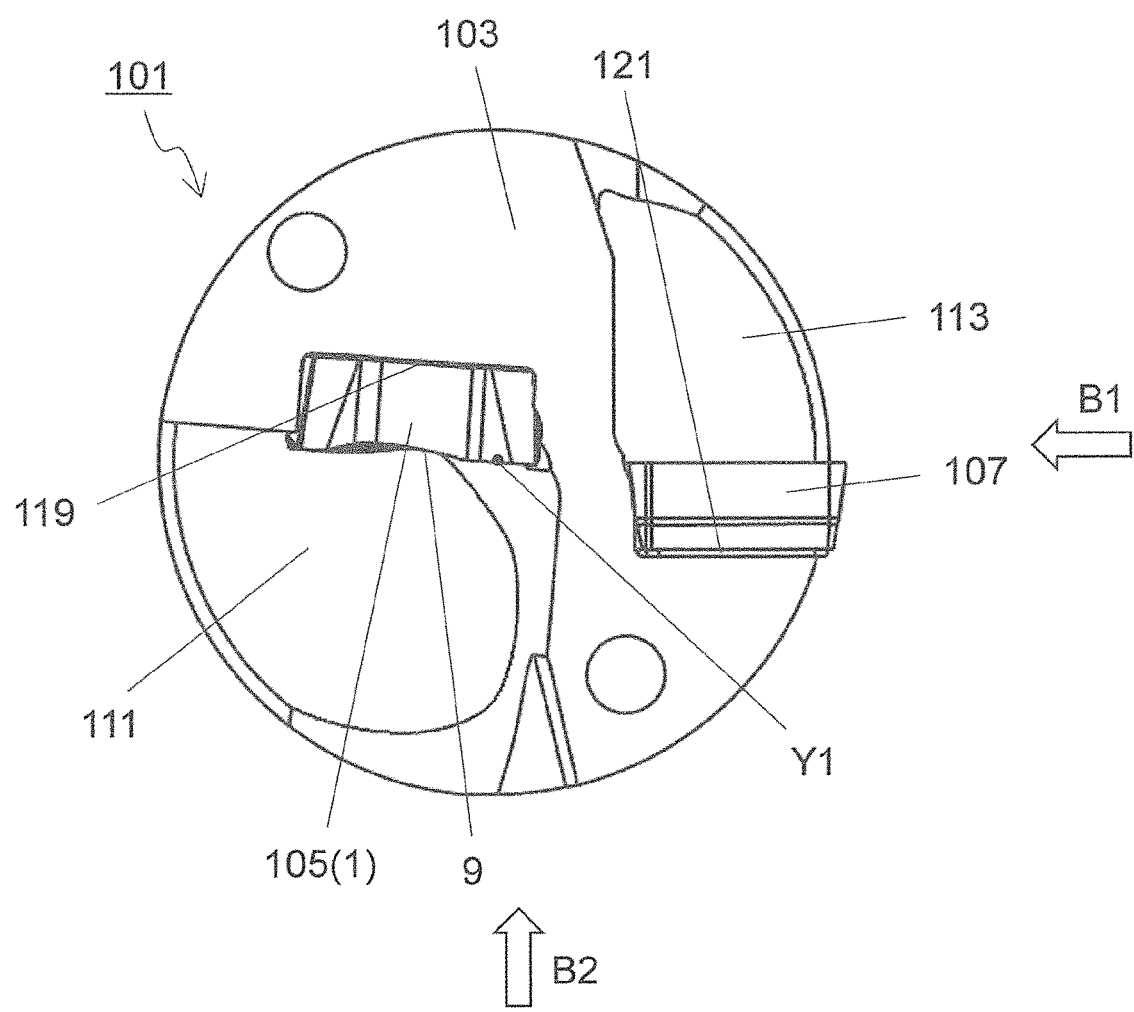
FIG. 11 is a front view taken at a front end of the drill shown in FIG. 9.
Figure 12:
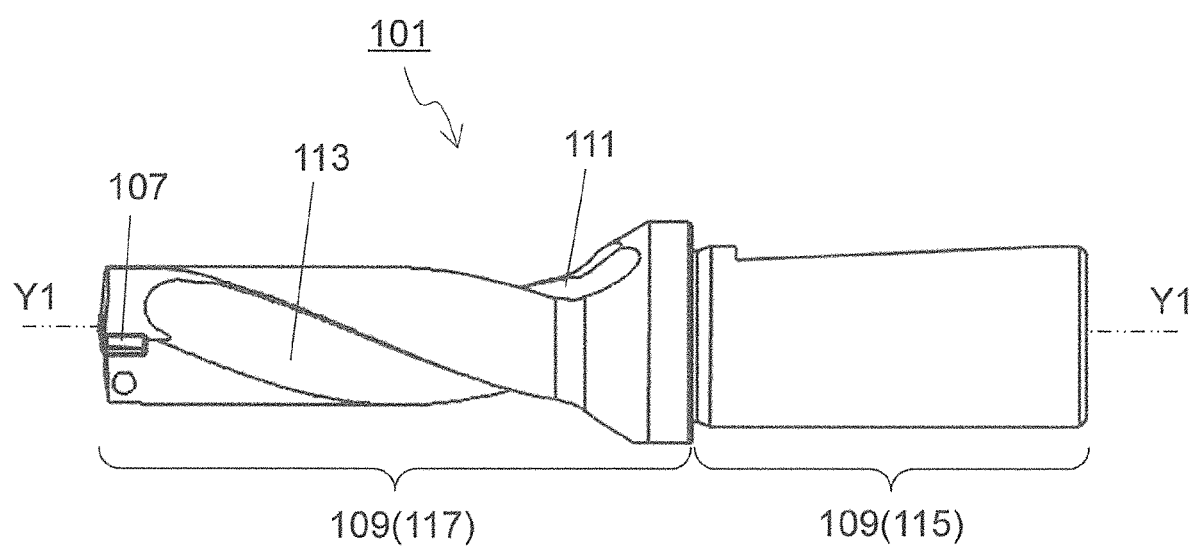
FIG. 12 is a side view of the drill shown in FIG. 11, taken from B1 direction.
Figure 13:
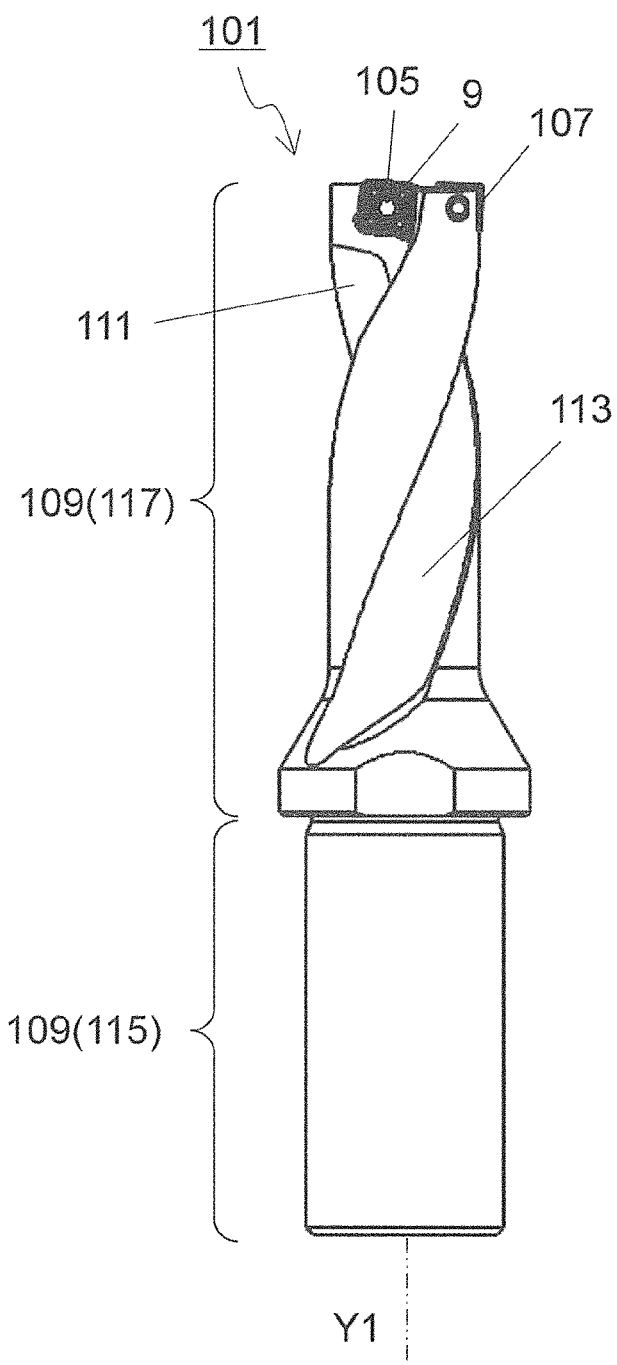
FIG. 13 is a side view of the drill shown in FIG. 11, taken from B2 direction.
Figure 14:
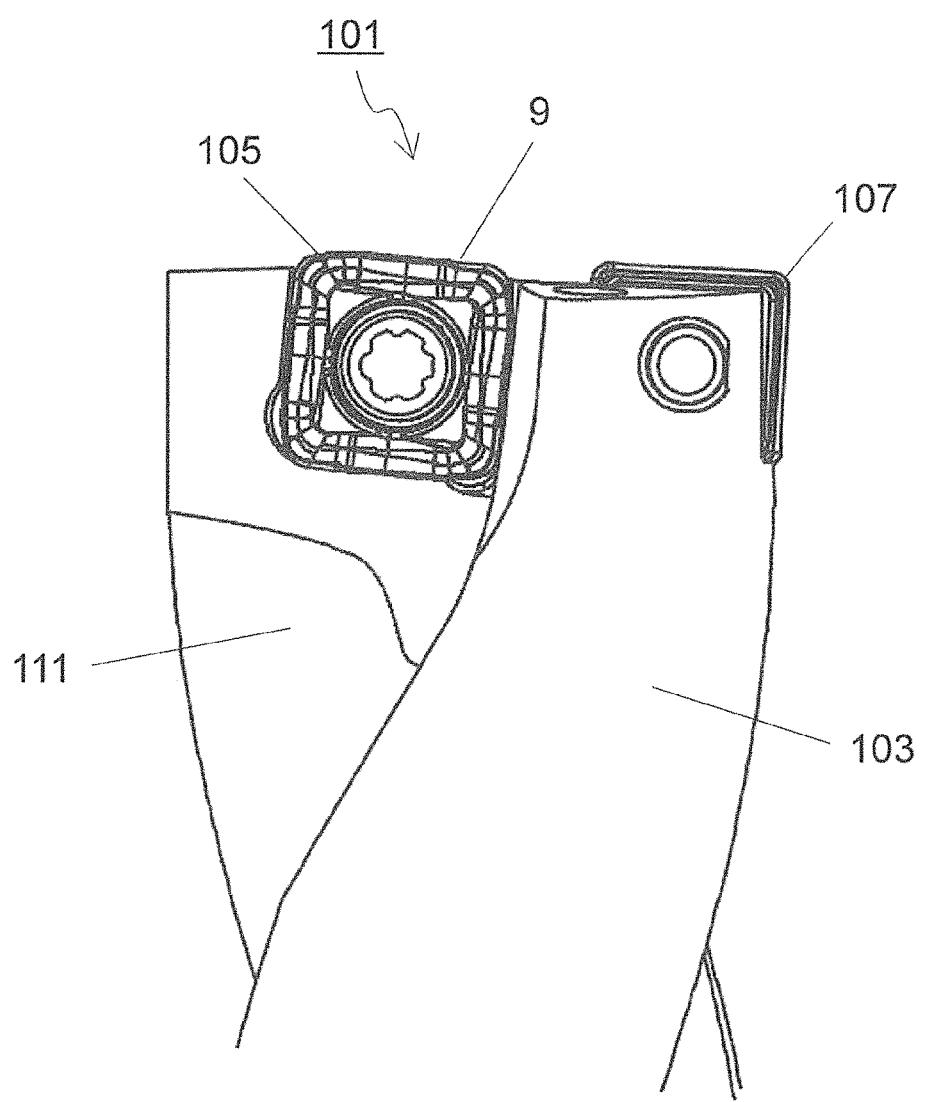
FIG. 14 an enlarged view of a front end part of the drill shown in FIG. 13.

As shown in FIGS. 9 to 11, a first pocket 119 and a second pocket 121 are located on the front end side of the cutting section 117 in the body part 109. The first pocket 119 is a recessed portion disposed close to the center at the front end of the cutting section 117, and is the portion to which the insert 105 is attached. The second pocket 121 is a recessed portion disposed close to the outer periphery at the front end of the cutting section 117, and is the portion to which the insert 107 is attached. The first pocket 119 and the second pocket 121 are disposed away from each other so that the insert 105 for the inner cutting edge and the insert 107 for the outer cutting edge do not come into contact with each other.

The insert 105 is located inside the first pocket 119, and the insert 107 is located inside the second pocket 121. Here, the insert 105 for the inner cutting edge is attached so that the second cutting edge 15 in the insert 105 for the inner cutting edge intersects the rotation axis Y1. In the present embodiment, an insert that is different from the insert 1 of the foregoing embodiment is used as the insert 107 for the outer cutting edge. Alternatively, the insert 1 of the foregoing embodiment may also be used as the insert 107 for the outer cutting edge.

The first flute 111 extends from the insert 105 for the inner cutting edge toward a rear end of the body part 109, and extends spirally around the rotation axis Y1. The second flute 113 extends from the insert 107 for the outer cutting edge toward the rear end of the body part 109, and extends spirally around the rotation axis Y1. In the present embodiment, the first flute 111 and the second flute 113 are disposed on the cutting section 117 in the body part 109, but are not disposed on the holding section 115.

In the drill 101 of the present embodiment, an outer diameter of the cutting section 117 can be set to, for example, 6-42.5 mm. The drill 101 of the present embodiment can be set to, for example, L=3D to 12D, in which L is a length of an axis (length of the cutting section 117), and D is a diameter (outer diameter of the cutting section 117).

As a material of the body part 109, for example, steel, cast iron, or aluminum alloy are usable. Steel is preferable in view of high rigidity.

The first flute 111 is intended mainly to discharge chips generated by the cutting edge of the insert 105 for the inner cutting edge. During the cutting process, the chips generated by the insert 105 for the inner cutting edge are discharged through the first flute 111 to the rear end side of the body part 109. The second flute 113 is intended mainly to discharge chips generated by the cutting edge of the insert 107 for the outer cutting edge. During the cutting process, the chips generated by the insert 107 for the outer cutting edge are discharged through the second flute 113 to the rear end side of the body part 109.

A depth of each of the first flute 111 and the second flute 113 is settable to approximately to 10-40% of an outer diameter of the cutting section 117. Here, the depth of each of the first flute 111 and the second flute 113 denotes a value obtainable by subtracting a distance between a bottom of each of the first flute 111 and the second flute 113 and the rotation axis Y1, from a radius of the cutting section 117 in a cross section orthogonal to the rotation axis Y1. Therefore, a diameter of a web thickness indicated by a diameter of an inscribed circle in the cross section orthogonal to the rotation axis Y1 in the cutting section 117 is settable to approximately 20-80% of the outer diameter of the cutting section 117. Specifically, for example, when the outer diameter D of the cutting section 117 is 20 mm, the depth of each of the first flute 111 and the second flute 113 is settable to approximately 2-8 mm.

<Method of Manufacturing Machined Product>

A method of manufacturing a machined product according to an embodiment of the present invention is described in detail below by exemplifying the case of using the drill 101 according to the foregoing embodiment. A description is given below with reference to FIGS. 15 to 17.

The method of manufacturing the machined product according to the present embodiment includes the following steps (1) to (4).

Figure 15:
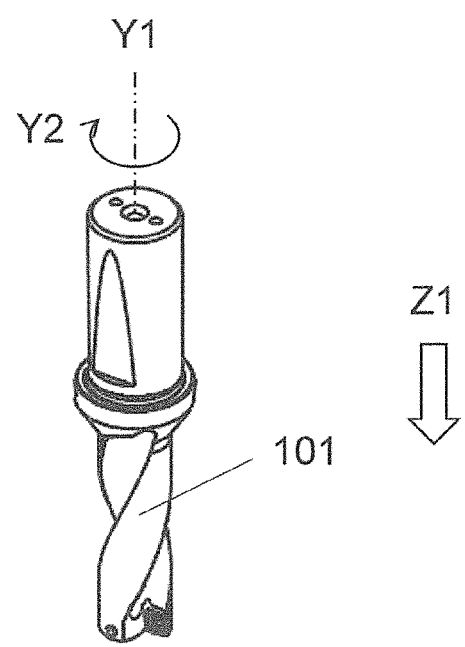
FIG. 15 is a schematic diagram that shows a step in a method of manufacturing a machined product according to an embodiment.
Figure 15:
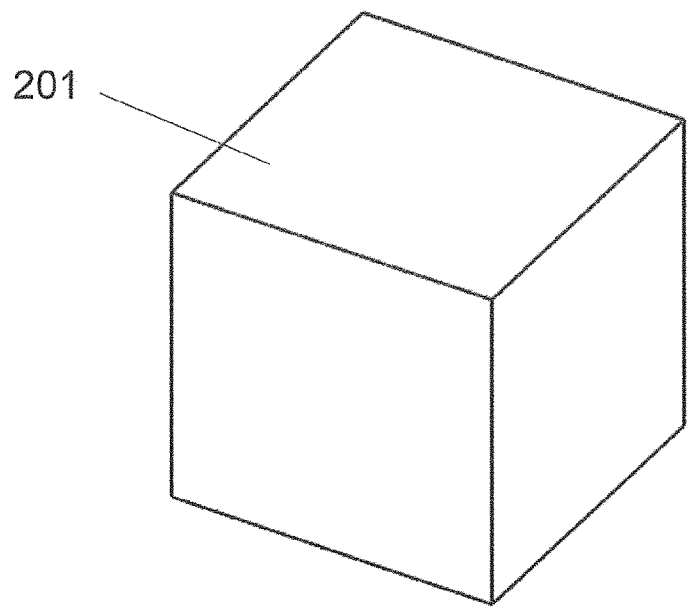

(1) The step of putting the drill 101 above a prepared workpiece 201 (refer to FIG. 15).

Figure 16:
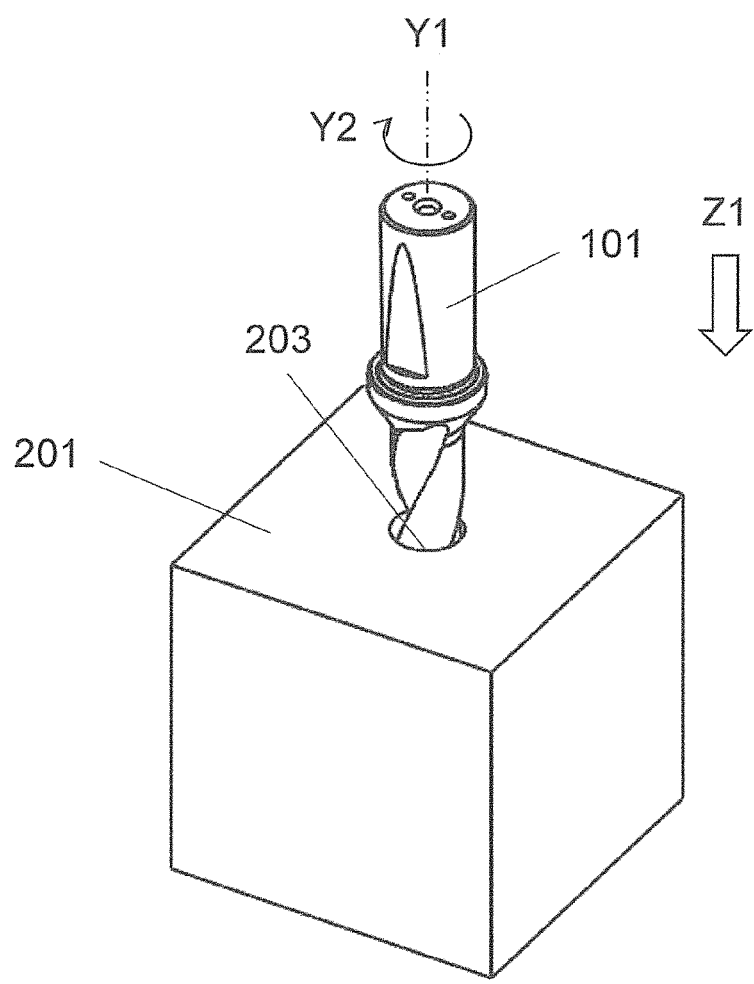
FIG. 16 is a schematic diagram that shows a step in the method of manufacturing a machined product according to the embodiment.

(2) The step of rotating the drill 101 around the rotation axis Y1 in a direction indicated by arrow Y2, and bringing the drill 101 closer to the workpiece 201 in Z1 direction (refer to FIGS. 15 and 16);

The above step is performable by, for example, fixing the workpiece 201 onto a table of the machine tool having the drill 101 attached thereto, and then bringing the drill 101 being rotated closer to the workpiece 201. In the above step, the workpiece 201 and the drill 101 need to be relatively close to each other. Alternatively, the workpiece 201 may be brought closer to the drill 101.

(3) The step of forming a drilled hole 203 in the workpiece 201 by bringing the drill 101 further closer to the workpiece 201 so as to cause the cutting edge 9 of the drill 101 being rotated to come into contact with a desired position on the surface of the workpiece 201 (refer to FIG. 16).

In the above step, a setting is preferably made so that a partial region on the rear end side of the cutting section of the drill 101 does not penetrate through the workpiece 201, from the viewpoint of obtaining a good finished surface. In other words, good chip discharge performance is producible through the partial region by making the partial region serve as a chip discharge region.

Figure 17:
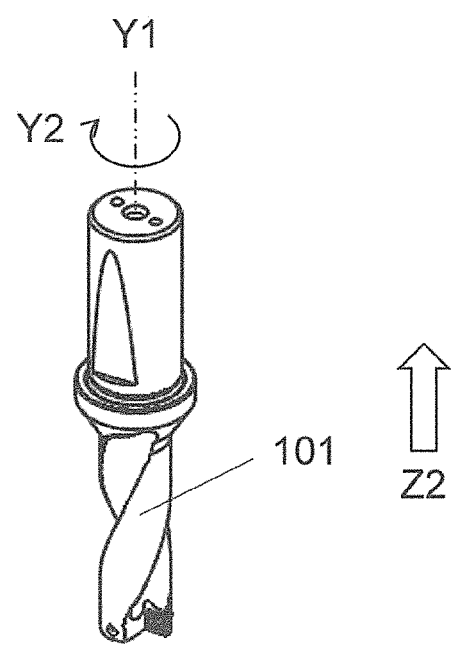
FIG. 17 is a schematic diagram that shows a step in the method of manufacturing a machined product according to the embodiment.
Figure 17:
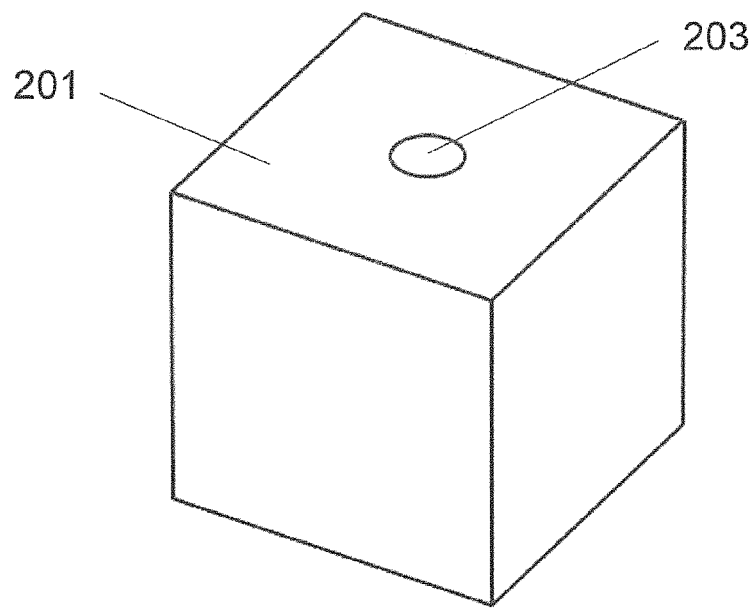

(4) The step of separating the drill 101 from the workpiece 201 in Z2 direction (refer to FIG. 17).

Also in the above step, the workpiece 201 and the drill 101 need to be relatively separated from each other as in the case with the above step (2). For example, the workpiece 201 may be separated from the drill 101.

The machined product having the drilled hole 203 is obtainable through the steps as described above.

When the foregoing cutting process of the workpiece 201 is performed a plurality of times, for example, when forming a plurality of drilled holes 203 in a single workpiece 201, it is necessary to repeat the step of bringing the cutting edge 9 of the drill 101 into contact with different portions of the workpiece 201, while keeping the drill 101 rotated.

Although the embodiments of the insert and the drill have been illustrated and described above, the inert and the drill of the present invention are not limited thereto. It is, of course, possible to make any optional ones insofar as they do not depart from the gist of the present invention.

DESCRIPTION OF THE REFERENCE NUMERAL 1 insert
3 upper surface
5 lower surface
7 side surface
9 cutting edge
11 through hole
13 first cutting edge
15 second cutting edge
17 third cutting edge
19 fourth cutting edge
21 inclined surface
23 first inclined surface
25 second inclined surface
27 third inclined surface
29 fourth inclined surface
31 ascending surface
101 drill
103 holder
105 insert for inner cutting edge
107 insert for outer cutting edge
109 body part
111 first chip discharge flute (first flute)
113 second chip discharge flute (second flute)
115 holding section
117 cutting section
119 first pocket
121 second pocket
201 workpiece
203 drilled hole

The invention claimed is:

1. An insert, comprising:
an upper surface comprising a corner part;
a lower surface;
a side surface located between the upper surface and the lower surface; and
a cutting edge located at least at a part of a region in which the upper surface and the side surface intersect each other, and comprising:
a first cutting edge located at the corner part;
a second cutting edge adjacent to the first cutting edge;
a third cutting edge adjacent to the second cutting edge; and
a fourth cutting edge adjacent to the third cutting edge, wherein
each of the third cutting edge and the fourth cutting edge has a concave curvilinear shape extending downward in a side view,
a radius of curvature of the fourth cutting edge is smaller than a radius of curvature of the third cutting edge,
the upper surface comprises an inclined surface being inclined downward as going farther from the cutting edge,
the inclined surface comprises:
a second inclined surface located along the second cutting edge;
a third inclined surface located along the third cutting edge; and
a fourth inclined surface located along the fourth cutting edge, and
an inclination angle of each of the third inclined surface and the fourth inclined surface is larger than an inclination angle of the second inclined surface.

2. The insert according to claim 1, wherein a length of the third cutting edge is larger than a length of the fourth cutting edge in a side view.

3. The insert according to claim 2, wherein the length of the third cutting edge is larger than a length of the second cutting edge in a side view.

4. The insert according to claim 1,
wherein the third cutting edge is inclined downward as going farther from the second cutting edge, and
wherein the fourth cutting edge is inclined upward as going farther from the third cutting edge.

5. The insert according to claim 1, wherein a boundary between the third cutting edge and the fourth cutting edge is located at a lower end of the cutting edge in a side view.

6. The insert according to claim 1,
wherein the upper surface comprises an inclined surface being inclined downward as going farther from the cutting edge,
wherein the inclined surface comprises:
a first inclined surface located along the first cutting edge;
a second inclined surface located along the second cutting edge;
a third inclined surface located along the third cutting edge; and
a fourth inclined surface located along the fourth cutting edge, and
wherein an inclination angle of each of the third inclined surface and the fourth inclined surface is larger than an inclination angle of the second inclined surface.

7. The insert according to claim 6, wherein the upper surface comprises an ascending surface that is:
located only inside a region extending from the third inclined surface to the fourth inclined surface; and inclined upward as going farther from the third inclined surface and the fourth inclined surface.

8. The insert according to claim 7, wherein an inclination angle of the ascending surface in a region located inside the fourth cutting edge is larger than an inclination angle of the ascending surface in a region located inside the third cutting edge.

9. An indexable insert drill, comprising:
a holder comprising a pocket located on a front end side; and
an insert according to claim 1, the insert being located in the pocket.

10. A method of manufacturing a machined product, comprising:
rotating a drill according to claim 9;
bringing the drill being rotated into contact with a workpiece; and
separating the drill from the workpiece.

11. The insert according to claim 1, wherein the second cutting edge has a straight line form parallel to the lower surface.

12. The insert according to claim 1, wherein
the upper surface further comprises a side part connected to the corner part, and
the second cutting edge, the third cutting edge and the fourth cutting edge are located at the side part.

13. An insert, comprising:
an upper surface comprising a corner part;
a lower surface;
a side surface located between the upper surface and the lower surface; and
a cutting edge located at least at a part of a region in which the upper surface and the side surface intersect each other, and comprising:
a first cutting edge located at the corner part;
a second cutting edge adjacent to the first cutting edge;
a third cutting edge adjacent to the second cutting edge; and
a fourth cutting edge directly connected to the third cutting edge, wherein
each of the third cutting edge and the fourth cutting edge has a concave curvilinear shape extending downward in a side view, and
a radius of curvature of the fourth cutting edge is smaller than a radius of curvature of the third cutting edge.

14. The insert according to claim 13, wherein a boundary between the third cutting edge and the fourth cutting edge is located at a lower end of the cutting edge in a side view.

15. An insert, comprising:
an upper surface comprising a corner part;
a lower surface comprising a flat surface;
a side surface located between the upper surface and the lower surface; and
a cutting edge located at least at a part of a region in which the upper surface and the side surface intersect each other, and comprising:
a first cutting edge located at the corner part;
a second cutting edge adjacent to the first cutting edge;
a third cutting edge adjacent to the second cutting edge; and
a fourth cutting edge adjacent to the third cutting edge, wherein
each of the third cutting edge and the fourth cutting edge has a concave curvilinear shape extending downward in a side view,
a radius of curvature of the fourth cutting edge is smaller than a radius of curvature of the third cutting edge, and
the second cutting edge has a straight line form parallel to the flat surface.

* * * * *